United States Patent [19]

Albers

[11] 4,047,276

[45] Sept. 13, 1977

[54] APPARATUS FOR DISPENSING RINGS AND FOR APPLYING PISTON RINGS TO PISTONS

[75] Inventor: Norbert C. Albers, Cincinnnati, Ohio

[73] Assignee: Designeers Midwest, Cincinnati, Ohio

[21] Appl. No.: 636,057

[22] Filed: Nov. 28, 1975

[51] Int. Cl.² .................. B23P 19/08; B23P 15/10
[52] U.S. Cl. ............................. 29/222; 29/809
[58] Field of Search ............ 29/222, 223, 224, 211 R, 29/211 C, 229, 269; 221/297, 298, 221, 223; 194/10, 15

[56] References Cited

U.S. PATENT DOCUMENTS

| | | | |
|---|---|---|---|
| 2,679,917 | 6/1954 | Andres | 194/10 |
| 2,792,625 | 5/1957 | Hoffman | 29/222 |
| 2,865,091 | 12/1958 | Prucha | 29/222 |
| 2,922,222 | 1/1960 | Jones | 29/211 R |
| 3,066,398 | 12/1962 | Nisper et al. | 29/222 |
| 3,333,673 | 8/1967 | Zemek | 29/211 C |
| 3,374,925 | 3/1968 | Ristau | 221/297 |
| 3,420,407 | 1/1969 | Christine | 221/221 |

FOREIGN PATENT DOCUMENTS

567,330  2/1945  United Kingdom .................. 29/269

Primary Examiner—James L. Jones, Jr.
Assistant Examiner—Roscoe V. Parker
Attorney, Agent, or Firm—Wood, Herron & Evans

[57] ABSTRACT

Apparatus for dropping rings one at a time from a stack and including apparatus for receiving piston rings so dropped and applying them to pistons. The apparatus includes a tube, upper and lower pawls slidably mounted in the lower end of said tube and an oscillating cam having a pin and slot interconnection to said pawls to cause them to project and retract alternately in order to drop a ring from the lower pawl while retaining the stack with the upper pawl and to drop the stack onto the lower pawl. Adjacent the lower end of the tube is a ring spreader which has a jaw engageable with one side of a piston ring and bifurcated jaw engageable with the other side of the piston ring with means to cause the jaws to engage the piston ring and spread the bifurcated jaws apart to open up the ring, whereupon the spreader may be lowered to position the ring around the piston.

13 Claims, 17 Drawing Figures

APPARATUS FOR DISPENSING RINGS AND FOR APPLYING PISTON RINGS TO PISTONS

This invention relates to apparatus for dropping rings including washers, piston rings, O-rings and the like one at a time from a stack, and the invention relates to apparatus for engaging piston rings so dropped, spreading the rings and lowering them onto a piston.

In the production of machinery, it is oftentimes desirable to drop generally circular objects one at a time from a stack onto the apparatus being assembled. There is presently no simple, reliable mechanism for so dispensing rings one at a time from a stack. As a consequence, such assembly operations are being performed by hand with the consequent high labor cost of producing the apparatus.

One of the objectives of the present invention has been to provide a dispenser for dropping circular articles reliably and automatically from a stack.

Another object of the invention has been to provide such a dispensing apparatus whose principles of operation are adapted to accommodate it to any size ring.

One particular area of manufacture wherein there is great need for a dispenser of the present invention is in the manufacture of engines wherein piston rings must be applied to pistons. In this area there are two systems presently in use. First, there is the manual application of rings by workmen one at a time to the pistons until a complete set of rings is applied. The second is through the use of complex and expensive machinery as exemplified by that described in U.S. Pat. No. 2,922,222.

It has therefore been another objective of the invention to provide, in association with the ring dispenser of the present invention, a mechanism for grasping the dispensed rings, spreading them and applying them to pistons.

The dispenser of the present invention is a simple but highly reliable mechanism comprising a tube having upper and lower pawls slidably mounted in the lower end of the tube, a cam disc rotatably mounted in the tube adjacent the pawls, a pair of slot means interconnecting the cam and pawls and means for oscillating the cam. The slots associated respectively with upper and lower pawls are oriented in such a way that rotation of the cam disc in the first direction will cause the upper pawls to retract and the lower pawls to project, thus permitting a stack of rings to drop onto the lower pawls. Rotation of the cam disc in the opposite direction causes the upper pawls to project to retain the stack and the lower pawls to retract to drop the lowermost ring.

The invention contemplates a ring spreader located adjacent the lower end of the tube and adapted to engage a dropped ring resting on a fixed lip at the lower end of the tube. The spreader has a first jaw formed with arcuate groove to receive one side of the ring and a bifurcated jaw similarly grooved to engage the opposite side of the ring having the gap. The bifurcated jaws are adapted to swing arcuately apart so that when the jaws are brought together onto a ring and the bifurcated jaw elements are spread apart, the ring is spread to increase its diameter sufficiently for it to pass over a piston. Means are provided to lower the spreader over a piston and to deposit the ring on a piston.

The invention further contemplates a dispenser having means to drop a pair of rings in vertically spaced relation and a spreader associated with such a dispenser wherein the spreader has a pair of vertically spaced grooves on each of its jaws adapted to capture two rings simultaneously and place the rings on a piston.

The several objectives and features will become more readily apparent from the following detailed description taken in conjunction with the accompanying drawings in which.

General Organization and Operation

Figure 1:
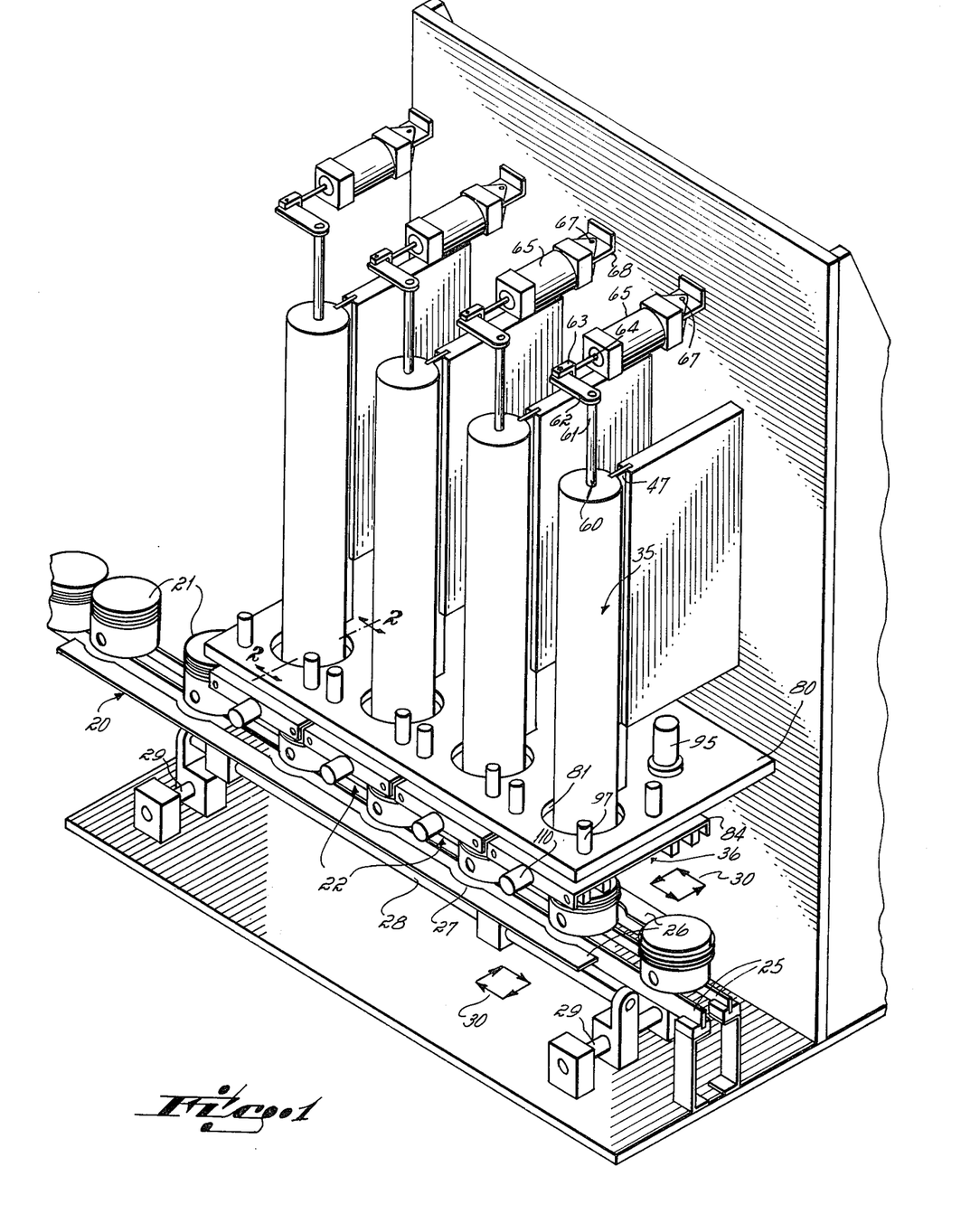
FIG. 1 is a diagrammatic illustration of the apparatus for applying rings to pistons.

FIG. 1 illustrates the general organization of the apparatus for applying rings to pistons. The apparatus includes a conveyor 20 for pistons 21, which conveyor is adapted to advance a series of longitudinally spaced pistons 21 one at a time through four ring-applying stations 22. The piston conveyor includes a pair of fixed rails 25 on which the pistons rest when in operative position and a pair of advancing bars 26 which move the pistons one at a time along the rails. The advancing bars have a series of spaced recesses 27 corresponding to the spacing of the respective stations 22. The advancing bars 26 are slidably mounted on longitudinal rods 28.

Means (not shown) are provided for reciprocating the advancing bars 26 with respect to the rods 28 to advance the pistons 21. The rods 28 are in turn slidably mounted on transverse rods 29 and means (not shown) are provided for reciprocating the rods 28 in the transverse direction. The timing of the longitudinal movement of the advancing bars 26 and the transverse movement of the rods 28 is such as to impart a generally rectangular component of motion to the bars as indicated by the arrows 30. Thus, the bars are brought together to clamp a group of pistons between them; are advanced downstream or in the machine direction to bring the pistons to a succeeding operating station; and are opened and returned to the original position ready to clamp and engage the set of pistons to advance them through another stage.

At each station 22 is a ring dispenser 35 having a mechanism to be described below for dropping rings one at a time onto a lip at the bottom of each dispenser. Located adjacent to each dispenser is a ring spreader 36 (to be described below) which is adapted to grasp a dropped ring, open it and place it in a proper groove of the piston.

In operation, a piston is conveyed to the leftmost station 22 as illustrated in FIG. 1 where it is brought to rest. The dispenser 35 drops a ring to a lowermost position on the dispenser. The ring is grasped by the spreader and placed on the piston. The piston is advanced to the next station downstream and the operation is repeated, except that the ring is placed in a different groove on the piston.

While four dispensers and spreaders for applying four rings to a piston are illustrated, it should be understood that several different combinations are available through the utilization of the principles of the invention. For example, five stations might be employed. The first three stations would be used for applying an oil ring and rails associated with the oil ring. The next two stations would be used for applying two compression or piston rings to the piston.

As will be described below, the dispensing and spreading apparatus can be modified to accommodate two rings at a time, thereby reducing the numbers of stations required. Thus, one station could be employed for applying the oil ring; one station could be utilized applying two rails and one station could be utilized for applying two compression rings.

Dispenser

Figure 2:
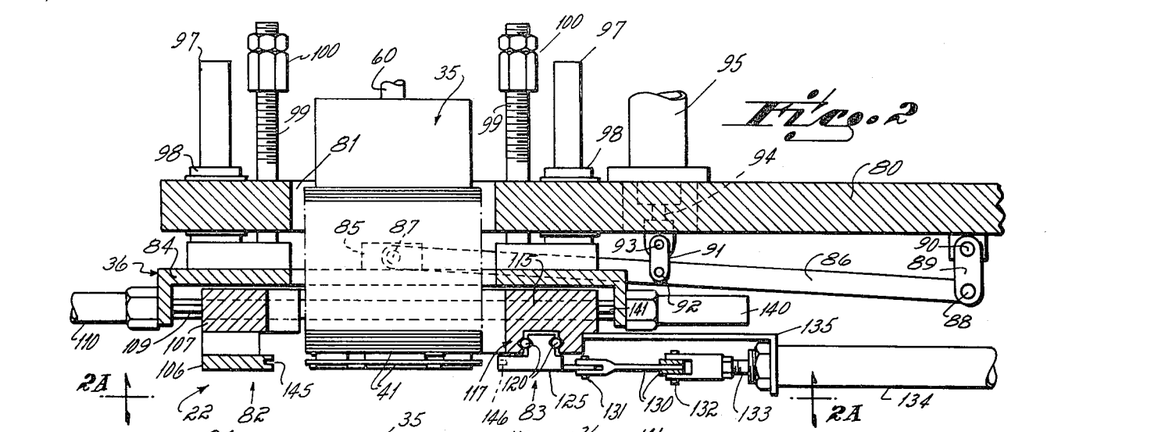
FIG. 2 is a cross-sectional view taken along lines 2—2 of FIG. 1.
Figure 2A:
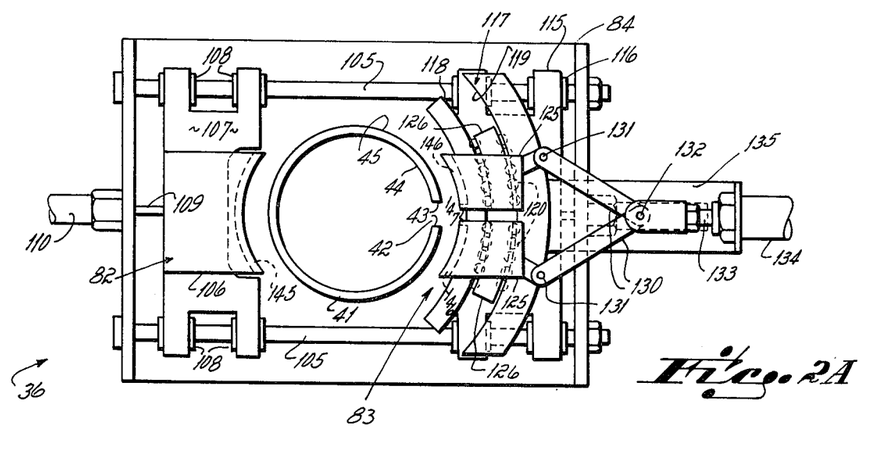
FIG. 2A is a bottom plan view taken along lines 2A—2A of FIG. 2.

The dispenser mechanism is best illustrated in FIGS. 6-9A. Each dispenser mechanism includes a tube 40 which is adapted to receive a stack of rings 41. As shown in FIG. 2A and as is well known, each ring 41 has a gap 42 defined by the ends 43 of the ring. The internal surface of the ring indicated at 44 is slightly chamfered (FIG. 8A), whereas the outer surface of the ring 45 is squared off.

Each tube 40 has a vertical flange 47 which receives the gap in each ring so that on a dispenser the rings are all oriented with their gaps aligned.

As has been indicated above, this dispenser is suitable for uses other than the dispensing of piston rings such as O-rings, washers and the like, and in such uses would not employ the flange 47. When such complete rings are dispensed, as contrasted to the gapped piston rings, it is advisable to provide a quick disconnect of the actuating mechanism at the top of the tube to facilitate resupplying rings to the stack.

At the bottom of the tube is a plate 48 having, for example, six radial slots 49 which slidably receive six radially-oriented pawls 50. Each pawl has a projecting lip 51. Half of the pawls 50a, 50b and 50c have lips which are spaced above the bottom of their slots 49 and are referred to as upper pawls. The remaining pawls 50d, 50e and 50f (lower pawls) have their lips lying along the bottom of the slots 49, the lips being vertically spaced apart by about the thickness of a ring. The lips, particularly of the upper pawls 50a—c, present sharp edges adapting them to project between the lowermost ring and the remainder of the stack in order to separate the lowermost ring from the rest of the stack, as will appear below.

Each pawl has an angulated cam slot 55, the cam slot forming an angle of about 70° with respect to a radius through the center of the tube. The slots of the upper pawls 50a–c are oriented in the opposite direction from the cam slots of the lower pawls 50d—f.

Figure 6:
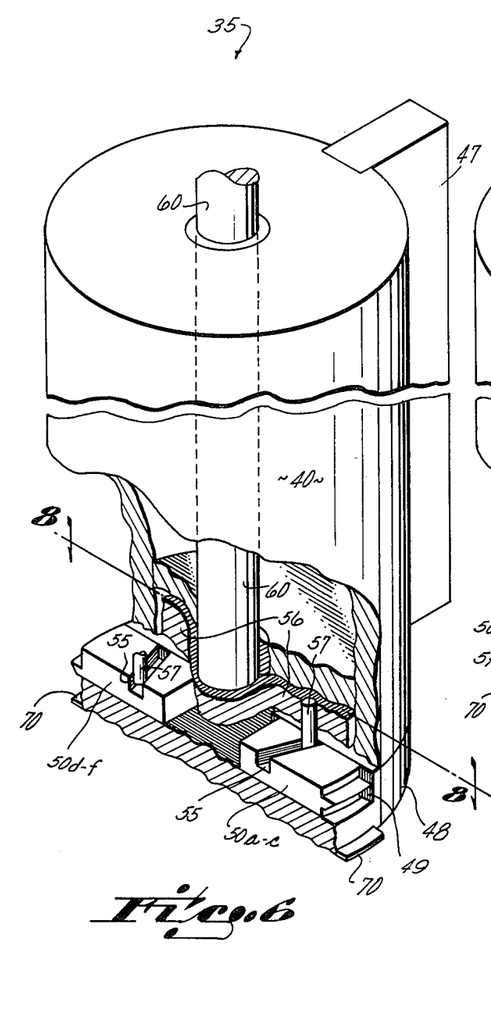
FIGS. 6 and 7 are diagrammatic perspective views partially in section illustrating the dispenser apparatus.
Figure 7:
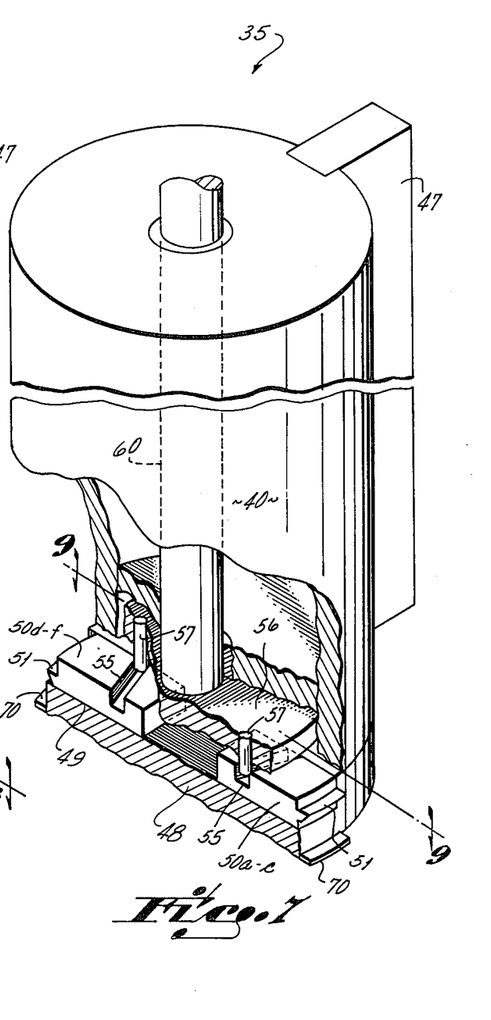
Figure 8:
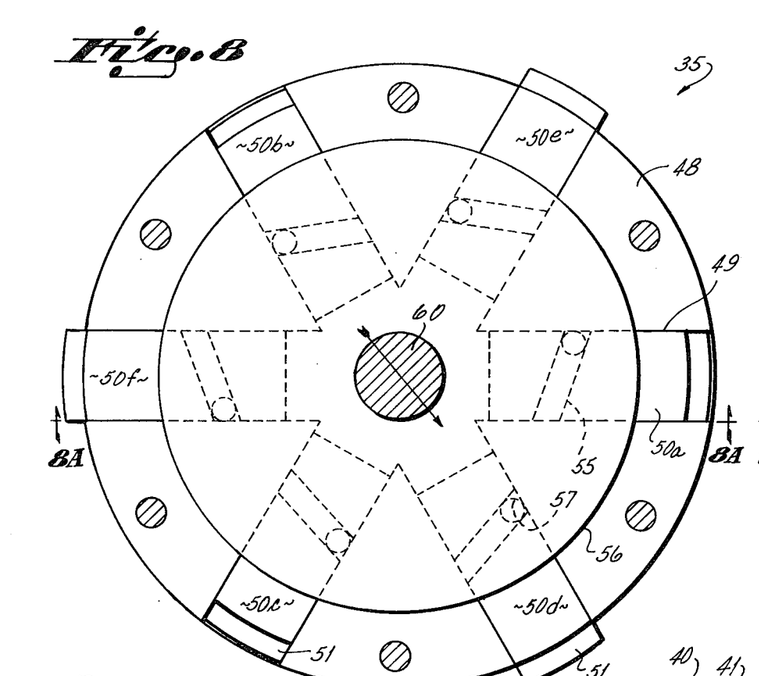
FIG. 8 is a cross-sectional view taken along lines 8—8 of FIG. 6 illustrating the cam and pawl mechanism.
Figure 9:
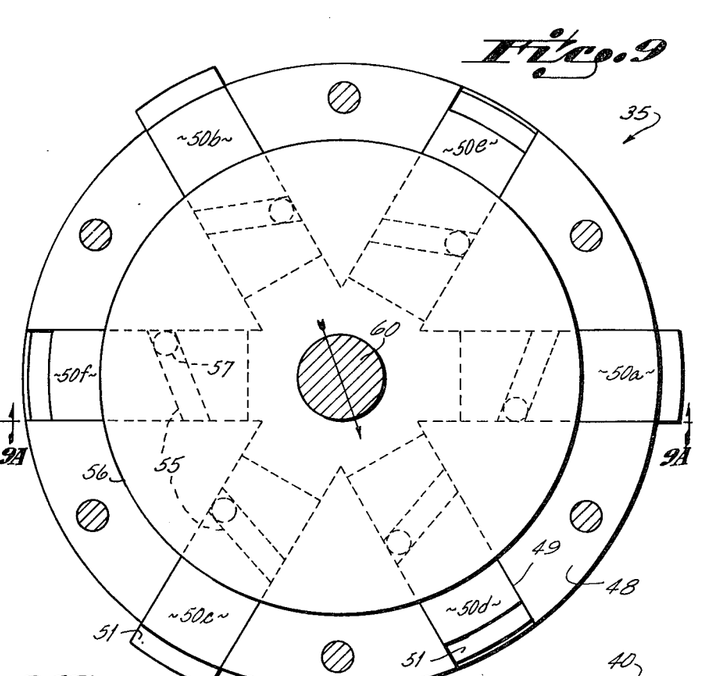
FIG. 9 is a cross-sectional view taken along lines 9—9 of FIG. 7.

Located immediately above the pawls 50 and plate 48 is a cam disc 56 which is rotatably mounted in the tube 40. The disc 56 has six pins 57 projecting downwardly from it and engageable with the cam slots 55 of the respective pawls 50. Oscillation of the discs 56 through an angle of about 15° will cause the pins 57 riding in the cam slots 55 to force the pawls either to project outwardly of the surface of the tube or retract inwardly of the surface of the tube. As shown in FIGS. 6 and 8, the disc has been rotated in a counterclockwise direction which has forced the upper pawls 50a–c to retract. As shown in FIGS. 7 and 9, the disc has been rotated in a clockwise direction, causing the upper pawls 50a—c to project and the lower pawls 50d-f to retract.

The disc 56 is mounted on a spindle 60 which has an upper end 61 projecting above the tube 40. Referring to FIG. 1, it can be seen that the spindle 60 has a radially-projecting arm 62 pivotally connected to a clevis 63 fixed on the end of a piston rod 64 forming part of a double-acting ram 65 (including the usual piston, cylinder and rod 64 projecting from the piston). The ram 65 is in turn pivoted at 67 to a bracket 68 mounted on the ring assembly apparatus. Energization of the ram in one direction will cause the spindle 60 and, hence, the cam disc 56, to rotate through its angle in a first direction, and energization of the ram in the opposite direction will cause the spindle 60 and, hence, the disc, to move in the opposite direction.

Figure 8A:
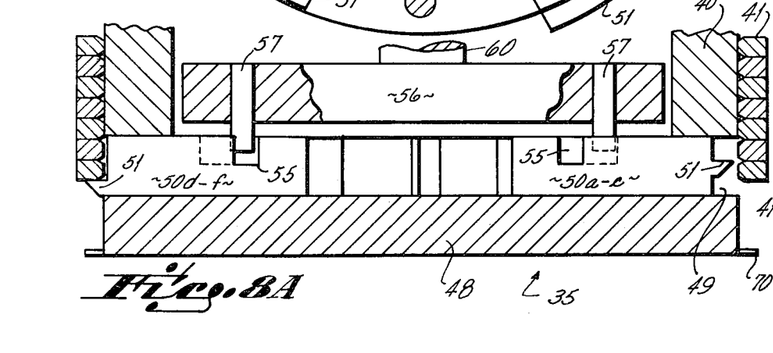
FIG. 8A is a cross-sectional view taken along lines 8A—8A of FIG. 8.
Figure 9A:
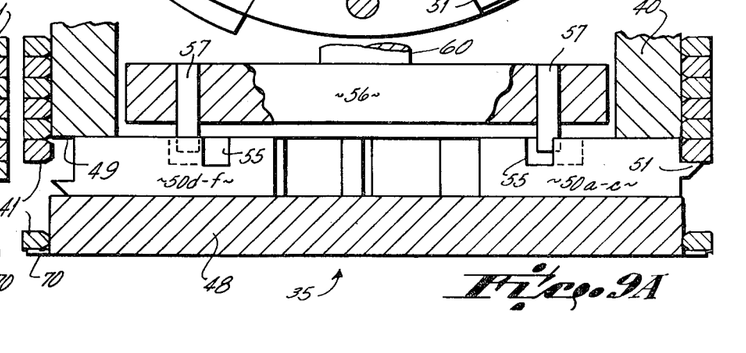
FIG. 9A is a cross-sectional view taken along lines 9A—9A of FIG. 9.

Through this sequence of operations, as illustrated in FIGS. 8A and 9A, the retraction of the upper pawls permits the stack of rings to drop down to the lower pawl and assume the attitude shown in FIG. 8A. Reversal of the movement of the disc causes the upper pawls 50a–c to project their lips into the space between the lowermost ring and the remainder of the stack and thus to retain the stack. Simultaneously, retraction of the lower pawls 50d-f permits the lowermost ring to drop. A fixed lip 70 is mounted at the lower end of the tube 40 to capture the separated and dropped ring.

The structure illustrated is subject to modification within the scope of the invention. For example, six pawls are preferred, but it may be possible to use any number, preferably an even number, with the upper and lower pawls being divided equally. Further, the positions of the pins 57 and slots 55 could be reversed by placing the slots in the cam and pins on the pawls without affecting the operation.

Ring Spreader Mechanism

The ring spreader 36 is best illustrated in FIGS. 2-5. The ring spreader is mounted on a support plate 80 which is fixed to the surrounding structure in order to maintain a fixed relationship to the dispenser 35. The plate has a hole 81 through which the dispenser 35 projects into an operative position with respect to the spreader mechanism. The spreader includes a back jaw 82 and a bifurcated front or gap jaw 83, the latter being engageable with that portion of the ring 41 which has a gap 42.

The jaws are movably supported on a vertically movable plate 84. The movable plate has a bracket 85 to which a lever arm 86 is pivotally attached at 87. The other end of the arm 86 is pivoted at 88 to a link 89 which is in turn pivoted at 90 to the fixed support plate 80. Intermediate the ends of the arm 86 is a link 91 pivoted at 92 to the arm, the other end of the link being pivoted at 93 to the rod 94 of a double-acting ram 95. Raising and lowering of the movable plate 84 is effected by the operation of the ram 95 to move the rod 94 up and down, the rod 94 in turn causing the arm 86 to move up and down. The support plate carries vertical posts 97 which are slidable in bushings 98 mounted in the fixed plate 80 to maintain the movable plate 84 and the jaw mechanism which it carries in precise alignment with a piston 21 located underneath it as plate 84 is moved up and down. The movable plate 84 also carries a pair of screws 99 each having a pair of adjustable nuts 100, the screws 99 passing through holes in the fixed plate 80. The nuts 100 may be vertically adjusted and locked into a vertical position so as to fix the lowermost point of the descent of the movable plate 84 and consequently the jaws 82, 83 which carry a ring. Thus, by adjustment of the nuts 100 on the spreader's respective stations 22, each spreader can be adapted to place a ring in a preselected groove 101 (FIG. 5) of the piston 21.

Figure 3:
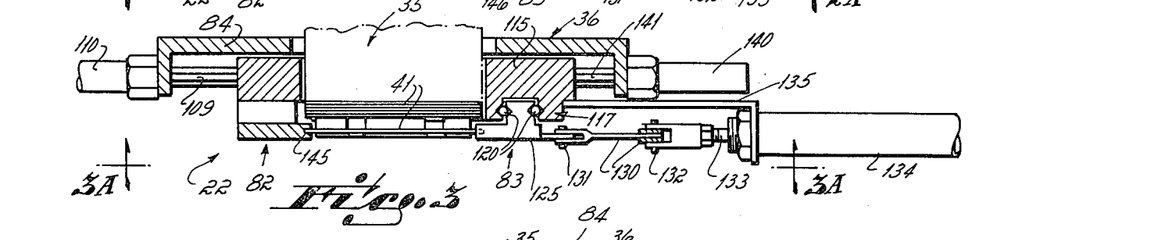
FIG. 3 is a cross-sectional view taken along lines 2—2 of FIG. 1 illustrating a second step in the ring-applying operation.
Figure 3A:
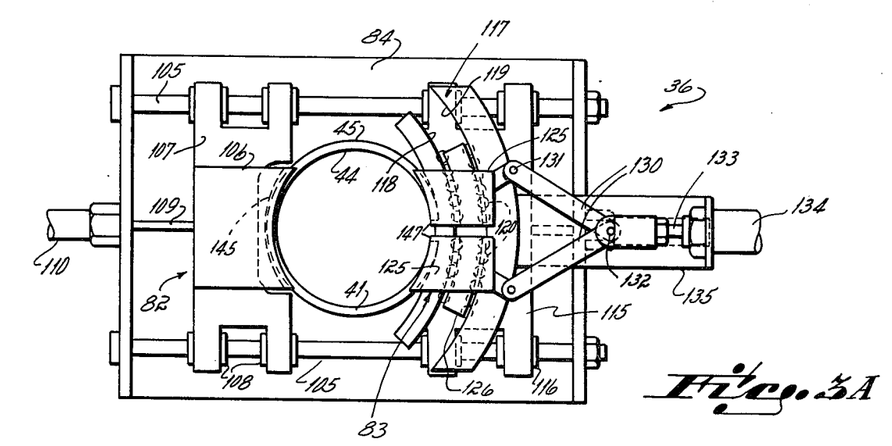
FIG. 3A is a bottom plan view of the apparatus of FIG. 3 taken along lines 3A—3A of FIG. 3.

As shown in FIGS. 2A-4A, the jaws 82, 83 are slidably mounted on a pair of horizontal rods 105. The back jaw 82 has a ring-engaging element 106 which is fixed to a carrier 107 having lateral bushings 108 for slidable engagement with the rods 105. The carrier 107 is fixed to a rod 109 of a double-acting ram 110, the ram being fixed to the movable plate 84. Energization of the double-acting ram 110 causes the back jaw 82 to be moved toward and away from the front or gap jaw 83 for the purpose of engaging and releasing one side of the ring.

The bifurcated front jaw 83 is similarly mounted on a carrier 115 which has lateral bushings 116 which slidably mount the carrier on the rods 105. The carrier 115 has a fixed track 117 which consists of two raceways 118 and 119 for anti-friction ball bearings 120. Movably supported in the track 117 are two jaw elements 125 fixed to arcuate bars 126 which are in engagement with the balls 120 and arcuately slidable in the track 117. A pair of links 130 have their ends 131 pivoted to the jaw elements 125. The opposite ends of the links 130 are pivoted on the same axis 132 on the end of a rod 133 forming part of a double-acting ram 134. The ram 134 is fixed to a bracket 135 which is in turn fixed to the carrier 115. Energization of the ram 134 causes the rod 133 to move toward and away from the track 117 which in turn causes the links 130 to spread and retract the jaw elements 125.

Above the bracket 135 is another double-acting ram 140 having a rod 141 fixed to the carrier 115. Energization of the double-acting ram 140 causes the carrier 115 to move toward and away from the back jaw 82 to grip and release the ring 41.

Figure 4:
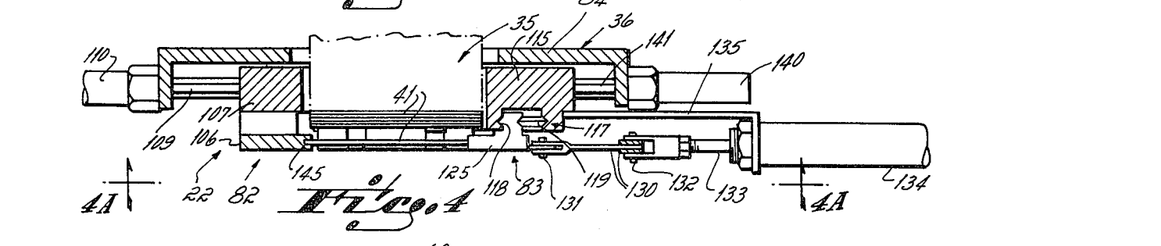
FIG. 4 is a cross-sectional view taken along lines 2—2 of FIG. 1 illustrating the third step in the ring-applying operation.
Figure 4A:
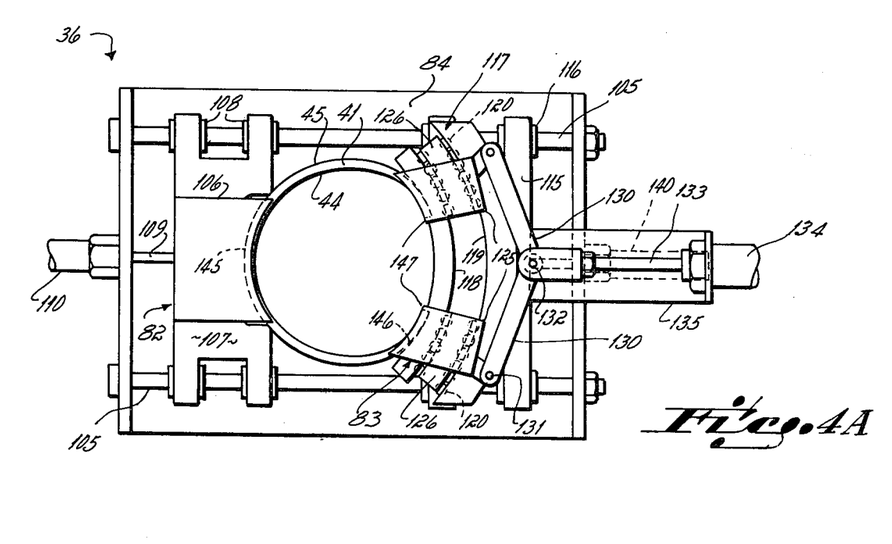
FIG. 4A is a bottom plan view of the apparatus of FIG. 4 taken along lines 4A—4A of FIG. 4.

The back jaw has a groove 145 having a radius approximating that of a ring when it is expanded, as shown in FIG. 4A. The groove is adapted to receive the back side of a ring 41.

The jaw elements 125 also have grooves 146 adapted to receive the gap end of a ring 41. Stops 147 are located in the grooves 146, the stops being engageable with the ends 43 of a ring.

In the operation of the spreader 36, the ring 41 to be placed on a piston is dropped to the lower end of the dispenser 35 and retained there by the lip 70. In that position the ring is horizontally aligned with the grooves 145 and 146 of the back and front jaws, respectively. The rams 110 and 140 are energized to bring the jaw elements 106 and 125 into engagement with the ring. Preferably, the jaws do not move snugly into engagement with the ring, but rather move to a position in which the bottoms of their grooves 145 and 146 are spaced from the ring so as to provide room for the ring to expand radially when it is spread apart. Alternatively, the rams could bring the jaws into snug engagement with the ring and then back off slightly during expansion of the ring to accommodate the increased radius of the ring.

Figure 5:
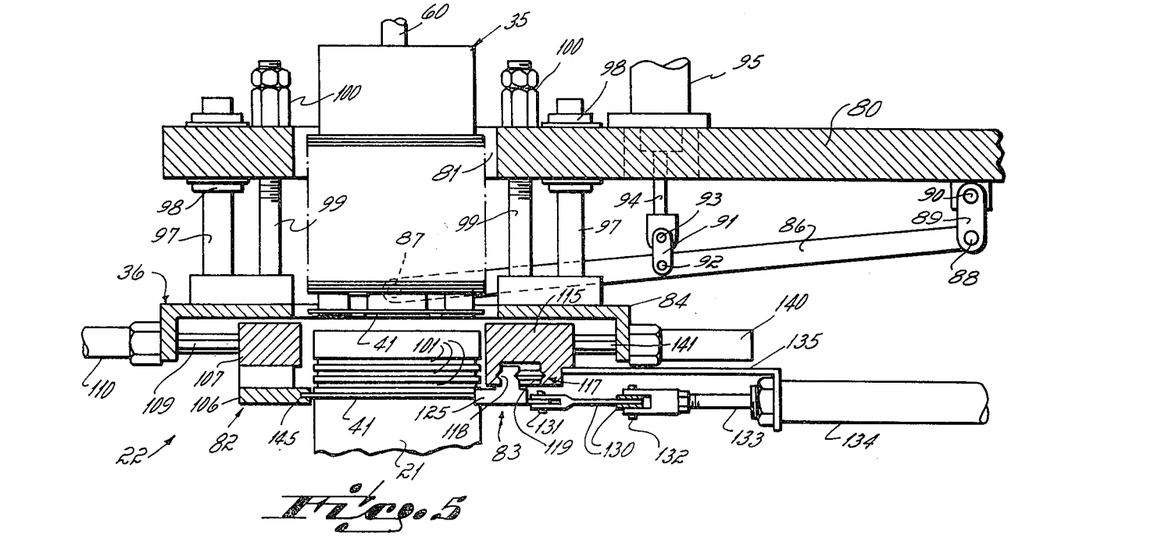
FIG. 5 is a cross-sectional view taken along lines 2—2 of FIG. 1 illustrating a fourth step in the ring-applying operation.

When the ring is located in the jaw grooves, the ram 134 is actuated to cause the jaw elements 125 to spread apart arcuately in the track 117 to spread the ring a sufficient distance so that its inside diameter is greater than the outside diameter of the piston as shown in FIGS. 4 and 4A. With the ring in the spread attitude, the ram 95 is actuated to lower the movable plate 84, carrying with it the jaws 82, 83 and the ring 41 until stopped by the nuts 100 on the screws 99. In this position, as shown in FIG. 5, the ring is aligned with a preselected groove 101 in the piston. The ram 134 is reversed to permit the ring to contract onto the piston where it is loosely retained in the groove 101. The rams 110 and 140 are reversed to spread the jaws apart. The ram 95 is then reversed to raise the movable plate 84 to bring the jaws into position to receive another ring, whereupon the operation is repeated when a new piston is brought into position.

Substantially identical operations take place at each of the stations 22 shown in FIG. 1, the only difference being that the nuts 100 on the screws 99 have differing positions in order to cause rings to be placed in different grooves of the piston. When all rings are assembled, they may be rotated by hand to provide assurance that the gaps in the rings are not in precise alignment, thus avoiding blowby when the rings are assembled in their respective cylinders in an engine. Alternatively to the manual rotation of the rings, the orientation of the rings could be determined initially by the orientation of the flanges 47 on the respective dispensers coupled with a reorientation of the spreader mechanisms to bring the bifurcated jaws into alignment with the ring gaps.

Two Ring Dispenser and Spreader

The invention contemplates apparatus whereby two rings may be placed on a piston simultaneously utilizing a single dispenser and spreader. Such apparatus is diagrammatically illustrated in FIGS. 10-12.

Figure 10:
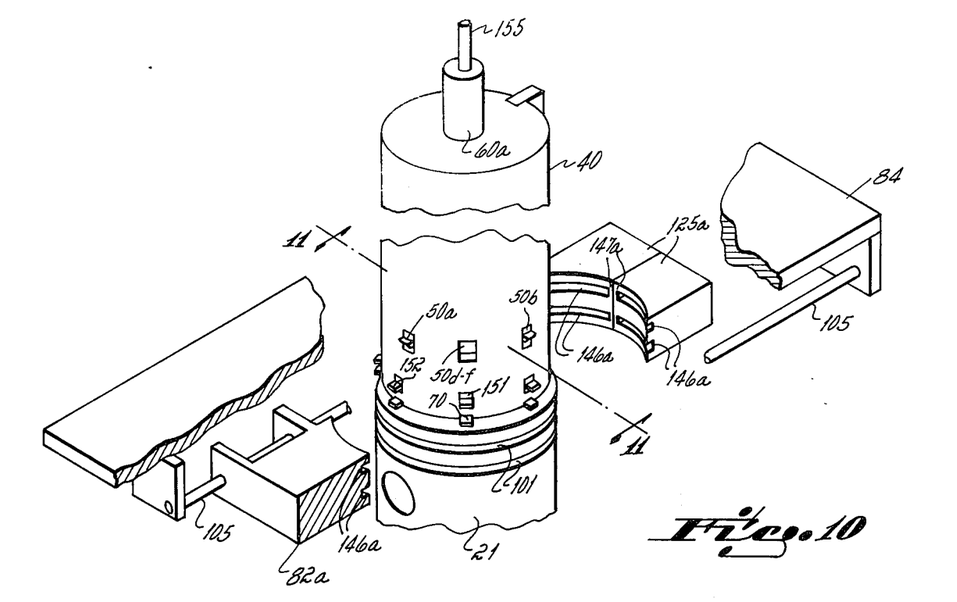
FIG. 10 is a diagrammatic perspective view of a double piston ring-applying apparatus.

As shown in FIG. 10, the spreader mechanism is identical to that previously described and illustrated in FIGS. 2-5 except that the back jaw element 82a has two grooves 145a and the bifurcated jaw elements 125a have two grooves 146a. The dispenser is adapted, as will be explained below, to drop two rings into a vertically spaced relationship corresponding to two grooves in a piston. The spreader then operates as described above to grip two rings, spread them and lower them into position to be placed into the two grooves of the piston.

In the dispenser the upper and lower pawls 50a–c and 50d–f, respectively, are located in the dispenser tube 40 and operated by an oscillating inner tube 60a, as described in connection with FIGS. 6-9A. Similarly, at the lower end of the dispenser is a fixed lip 70 to retain a lowermost ring. Located below the slotted pawl-receiving plate 48 is a second pawl-receiving plate 150 carrying a plurality of pawls 151 which are radially slidable in slots in the plate 150. Each pawl has a projecting lip 152 on its outer end. The inner end 153 of each pawl 151 is pivotally connected to a link 154 which is in turn pivotally connected to a rod 155. The rod 155 is slidable in the tubular spindle 60a between an upper position and a lower position. In the upper position, the pawls 151 are retracted, as shown in FIG. 11, and in the lower position the pawls are projected, as shown in FIG. 12.

Figure 11:
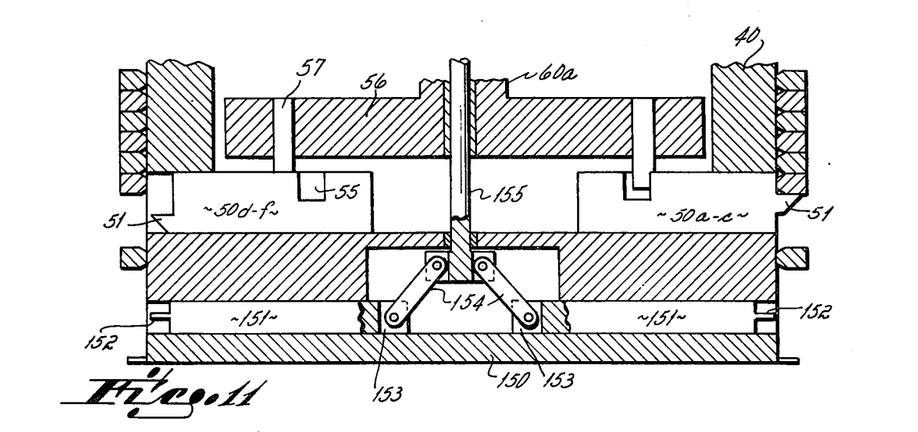
FIG. 11 is a cross-sectional view taken along lines 11—11 of FIG. 10.
Figure 12:
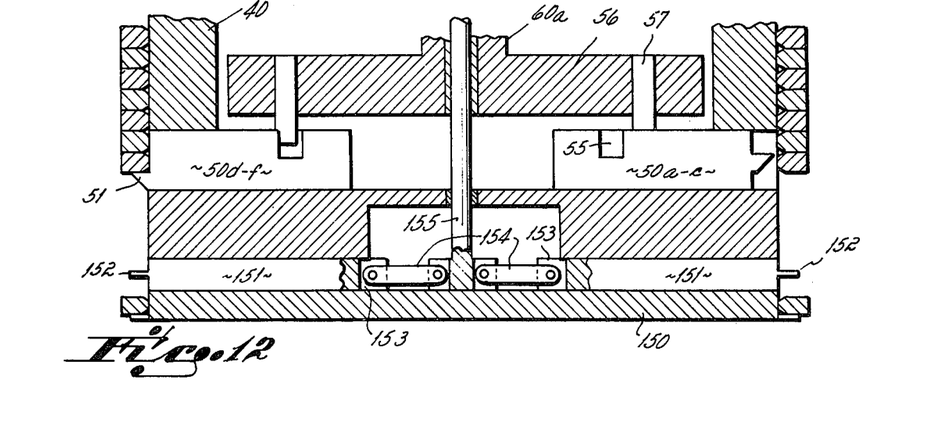
FIG. 12 is a cross-sectional view taken along lines 11—11 of FIG. 10 illustrating another step in the operation.

In the operation of the dispenser, the pawls 151 are initially retracted, as shown in FIG. 11, by raising the rod 155. The lower pawls 50d-f are retracted to drop a ring 41 past the retracted pawls 151, while the upper pawls 51a-c retain the remaining rings 41 of the stack. The ring drops to the lower lip 70. The rod 155 is then lowered to project the pawls 151, as shown in FIG. 12. In this position the dispenser is once again operated through a cycle to drop a second ring 41. The second ring will come to rest on the lip 152 of the pawl 151. The two rings 41 are thus held on the respective lips 70 and 152 in alignment with the grooves 145a and 146a of the spreader jaws. The spreader is then actuated as described to place the two rings into two grooves to a piston waiting below the spreader.

I claim:

1. Apparatus for applying rings to pistons comprising:
    a tube to receive a stack of rings,
    a plate in the lower end of said tube,
    a plurality of radial pawl slots in the upper surface of said plate,
    a plurality of upper and lower pawls slidably mounted in said slots,
    a cam disc rotatably mounted in said tube above said pawls,
    slot and pin means interconnecting said disc and pawls to cause said pawls to project beyond said tube and retract upon oscillation of said disc, said upper pawls retracting when said lower pawls project and vice versa,
    a fixed lip at the lower end of said tube,
    a spreader located adjacent said fixed lip, said spreader having:
        a pair of opposed jaws,
        means for moving said jaws toward and away from each other to grip and release a ring,
        means on one of said jaws for engaging the gap ends of a ring and spreading them apart,
        means for lowering said jaws to bring a ring around a piston.

2. Apparatus for applying rings to pistons comprising:
    a plurality of longitudinally spaced vertical tubes, each tube adapted to receive a stack of rings,
    a lip projecting from the lower end of each tube,
    means for dropping rings one at a time onto said lip,
    a ring spreader located adjacent each said lip to engage and spread open a ring,
    means to lower each said spreader into position around a piston, and
    conveyor means for advancing a series of longitudinally-spaced pistons sequentially into position under respective tubes, to receive rings one at a time.

3. Apparatus for applying rings to pistons comprising:
    a tube to receive a stack of rings,
    a lip projecting from the lower end of said tube,
    means for dropping rings one at a time onto said lip,
    a ring spreader located adjacent said lip to engage and spread open a ring,
    and means to lower said spreader into position around a piston located below said spreader to permit said spreader to place a ring on said piston.

4. Apparatus as in claim 3 in which said spreader comprises:
    a first jaw engageable with one side of a ring,
    a second bifurcated jaw for engaging a ring on each side of the ring gap,
    means for moving said jaws toward each other to engage and spread a ring,
    and means for retracting said jaws to deposit a ring on a piston.

5. Apparatus as in claim 4 in which each said jaw has a groove slightly larger than the thickness of a ring to receive said ring.

6. Apparatus as in claim 4 in which said bifurcated jaw includes two jaw elements,
    each said jaw element being mounted in a curvilinear track,
    and means for spreading said elements away from each other to open said ring.

7. Apparatus as in claim 6 further comprising a stop in the groove of each bifurcated jaw, said stops engaging the ends of said ring when said ring is lodged in said groove and said jaw elements are spreading apart.

8. Apparatus as in claim 6 further comprising:
    anti-friction means supporting said jaw elements in said track.

9. Apparatus according to claim 2 in which each said spreader lowering means has means for lowering said spreader to a preselected position corresponding to the location of a groove on each said piston to receive a respective ring.

10. Apparatus as in claim 2 further comprising means for adjusting said preselected position.

11. Apparatus for applying rings to pistons comprising:
    a tube to receive a stack of rings,
    a fixed lip projecting from the lower end of said tube,
    a plurality of lips spaced above said first lip and slidable between retracted and projecting positions on said tube,
    means for projecting and retracting said lips,
    means for dropping said rings one at a time onto said sliding lips,
    a ring spreader located adjacent said fixed and slidable lips to engage and spread open a pair of rings resting on said fixed and slidable lips, respectively,
    and means to lower said spreader into position around a piston below said spreader to permit said spreader to place said rings on said piston.

12. Apparatus as in claim 11 wherein retracting and projecting means comprise:
    a rod vertically slidable through the center of said tube,
    a plurality of angulated cam slots on the lower end of said rod,
    and pins mounted on said slidable lips and riding in said slots to cause said lips to project and retract as said rod is reciprocated with respect to said tube.

13. Apparatus as in claim 12 wherein said dropping means comprises,
    upper and lower pawls slidably mounted in said tube above said slidable lips,
    a cam disc rotatably mounted in said tube adjacent said pawl,
    pin and slot means interconnecting said pawls and disc,
    an inner tube fixed to said disc and projecting from the top of said first named tube,
    means for oscillating said inner tube to cause said pawls to project and retract said rod passing through said inner tube and being slidable with respect to said inner tube.

* * * * *